United States Patent [19]
Jokinen et al.

[11] Patent Number: 5,570,185
[45] Date of Patent: Oct. 29, 1996

[54] METHOD FOR POSITIONING A MEASURING DEVICE EMITTING AND RECEIVING OPTICAL RADIATION FOR MEASURING WEAR IN THE LINING OF A CONTAINER

[75] Inventors: Hannu Jokinen; Kari Maatta, both of Oulu, Finland

[73] Assignee: Rautaruukki Oy, Oulu, Finland

[21] Appl. No.: 359,635

[22] Filed: Dec. 20, 1994

[30] Foreign Application Priority Data

Dec. 29, 1993 [FI] Finland ................................. 935918

[51] Int. Cl.⁶ .......................... G01B 11/00; G01B 11/03
[52] U.S. Cl. ................. 356/376; 356/5.1; 356/139.03; 356/141.2; 356/375
[58] Field of Search ................................. 356/376, 375, 356/372, 381, 382, 5.1–5.15, 139.03, 141.1, 152.2, 152.3; 250/559.19, 559.22, 559.27, 559.29, 559.38

[56] References Cited

U.S. PATENT DOCUMENTS

| | | | |
|---|---|---|---|
| 4,025,192 | 5/1977 | Scholdstrom et al. | 356/5.15 |
| 4,172,661 | 10/1979 | Marcus et al. | 356/152 |
| 4,227,802 | 10/1980 | Scholdstrom et al. | 356/5.15 |
| 4,708,482 | 7/1992 | Neiheisel | 356/376 |
| 5,125,745 | 6/1992 | Neiheisel et al. | 356/372 |
| 5,127,736 | 7/1992 | Neiheisel | 356/376 |
| 5,212,738 | 5/1993 | Chande et al. | 356/376 |

*Primary Examiner*—Hoa Q. Pham
*Attorney, Agent, or Firm*—Sughrue, Mion, Zinn, Macpeak & Seas

[57] ABSTRACT

A method for positioning a device emitting and receiving optical radiation for measuring wear in the lining of a container involves fixing the coordinate systems of the device and the container to each other by measuring the position of specific fixing points (P1, P2, P3) in the coordinate system (16) of the device (1). The fixing points have a regular shape. The position of each fixing point is measured by deflecting optical radiation in two intersecting directions across the fixing point, by measuring the optical radiation reflected from the fixing point, by determining on the basis of the optical radiation reflected to the measuring device at least two intersections, in both deflection directions, between the fixing point and the optical radiation emitted, and by calculating, on the basis of these at least four intersections, a directing point, to which the optical radiation emitted by the device is directed for determining the coordinates of the fixing point.

15 Claims, 4 Drawing Sheets

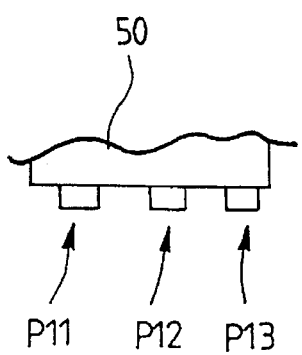
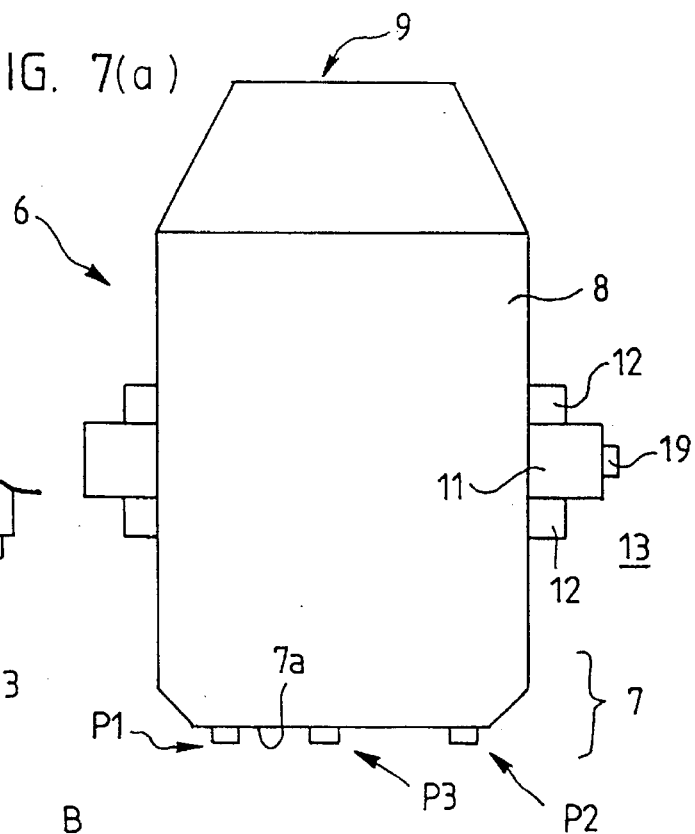
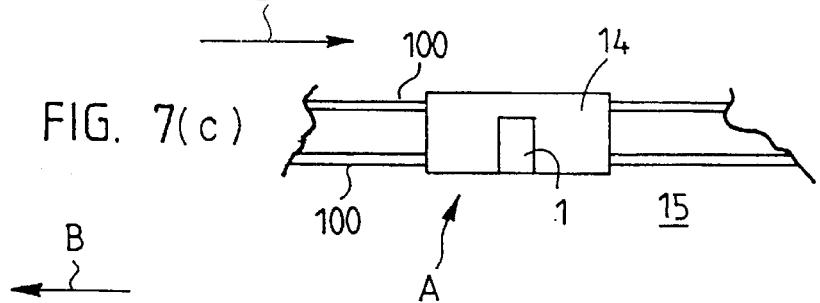
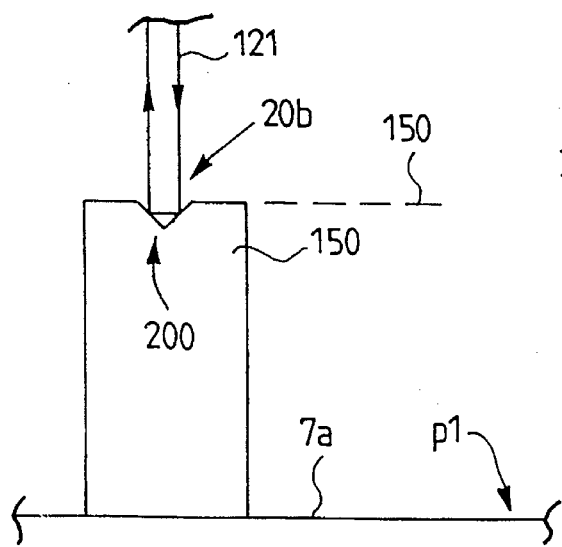
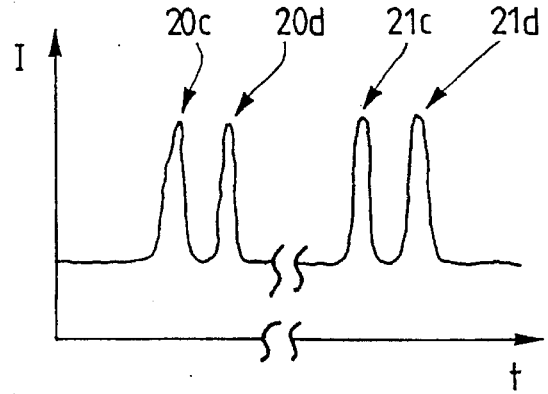
FIG. 7(a)
FIG. 7(b)
FIG. 7(c)
FIG. 8
FIG. 9

METHOD FOR POSITIONING A MEASURING DEVICE EMITTING AND RECEIVING OPTICAL RADIATION FOR MEASURING WEAR IN THE LINING OF A CONTAINER

BACKGROUND OF THE INVENTION

The invention relates to a method for positioning a measuring device emitting and receiving optical radiation for measuring wear in the lining of a container, said method comprising fixing the coordinate systems set for the measuring device and the container, said fixing comprising mathematically combining the coordinate systems of the measuring device and the container by measuring the position of specific fixing points in the coordinate system of the measuring device.

It is extremely significant to measure wear in the lining of converters or ladles used in steel making. This renders it possible to optimize the service life of the container and to prevent excessive wear in the lining from causing risks pertaining to production or industrial safety. Wear linings of converters must be renewed relatively often, as their life time varies from a week or two normally to no more than a few months, depending on what is melted in the converter, on the material of which the lining is made, and naturally on the number of meltings for which the converter is used. Generally speaking, a converter can last for about 100 to 5000 meltings.

The wear in a lining is measured by a method based on measuring the propagation time or phase difference of a laser beam: the laser beam is directed to the lining on the inner surface of a converter, from which it is reflected back to the measuring device. In the method based on measuring the propagation time, the distance between the measuring device and each measured point on the lining to be measured in the coordinate system of the measuring device can be calculated on the basis of the time difference between the emitting time and the return time of the laser beam. The measured points define the wear profile of the lining, which may be output for instance to a display terminal, by which the wear profile measured from a converter in use can be compared graphically and numerically with the profile that was measured of the inner surface of the same container during the modelling step before the container was actually brought into use, i.e. before the first melting.

To measure wear in the lining of three-dimensional objects, such as converters, ladles and other containers used in the steel industry, by non-contacting methods, such as laser measurement, requires that the measuring device and the object to be measured be represented in the same coordinate system. Combining the coordinate systems of the measuring device and the object to be measured is called fixing. In other words, the measuring device is positioned in relation to the object. For the fixing, it is necessary to use at least three fixing points to each of which the laser beam of the measuring device is directed in turn, and from which the coordinates of each fixing point in the coordinate system of the measuring device are measured. Even if the measuring device has a fixed or semi-fixed position in the vicinity of the container, it is necessary, in any case, to perform the fixing separately for each lining measurement; thus it is ensured that a change in the ambient conditions, and other factors do not cause any errors. To perform fixing each time all over again is also necessary in order that to estimate whether the fixing has succeeded.

In the so-called direct procedure normally used for positioning, or fixing, stationary fixing points are mounted on the object to be measured such as a container—more specifically, in the vicinity of the container opening. By means of the fixing points, the coordinate systems of the object and the measuring device can be mathematically combined. In the direct procedure, the object to be measured and the measuring device can be included in the same coordinate system by measuring at a time both the fixing points and the points to be actually measured.

In a special case where the object to be measured is supported by a pivoted axle, it is possible to use indirect angle measurement fixing, in which the fixing points are located outside the container. An angle measuring device can be mounted, for example, on the pivoted axle of the container or elsewhere in the container if a so-called inclinometer is employed. At present, fixing by means of angle measurement is an indirect method which is used when it is impossible to provide the object to be measured with necessary fixing points which are clearly visible and whose position is even otherwise suitable. Angle measurement fixing has been performed using fixing points in structures outside the object to be measured and an angle value obtained from the angle measurement device; this has allowed the coordinate systems to be mathematically combined. The fixing points have been attached to the frame structures of a factory wall, for example, in proximity to the converter. When angle measurement is used in the known methods, the angle measurement device informs the measuring device of the position of the object, or container, in relation to the known environment.

In both direct and indirect angle measurement fixing, the fixing points are, for example, small steel plates, to which the laser beam emitted by the measuring device is manually directed, for instance by means of binoculars or some other instrument. In these known methods, the aim is to direct the laser beam manually to the centre of the fixing point; in order that the fixing could succeed, the operators of the measuring device are thus required to perform several operations before all fixing points have been measured. The drawback of these known methods is that it is difficult to automate the fixing operation; in addition, when the fixing is performed by a human being, there is a risk of errors in both the estimation of the centre of the fixing point and the actual directing step.

SUMMARY OF THE INVENTION

The object of the present invention is to provide a new type of method which avoids the problems pertaining to the known solutions.

This is achieved with a method according to the invention, which is characterized in that the fixing or calibration points used for fixing the coordinate systems are of a substantially regular shape, that the position of each fixing point in the coordinate system of the measuring device is measured by deflecting optical radiation in two intersecting directions across the fixing point, by measuring the optical radiation reflected from the fixing point, by determining, on the basis of the optical radiation reflected to the measuring device, at least two intersections between the fixing point and the optical radiation emitted in both deflection directions, and by calculating on the basis of these at least four intersections a directing point, to which the optical radiation emitted by the measuring device is directed for determining the coordinates of the fixing point in the coordinate system of the measuring device.

The method according to the invention is based on the idea of replacing a conventional fixing point with a fixing point of a regular shape, preferably circular, and more preferably annular; the centre of the fixing point is determined by two laser beam deflections with different directions, and the necessary calculations; a laser beam is directed to this centre, whereby the accurate coordinates of the fixing point in the coordination system of the measuring device are found out.

The method of the invention has several advantages, since the new fixing procedure is easy to automate. The centre of the fixing point of a regular shape, i.e. the location of the desired directing point, is determined on the basis of calculations done by an apparatus, not on the basis of an ocular estimate made by a human being. The annular fixing point of a regular shape, preferably circular, allows the position of the centre to be determined mathematically. On the basis of the data obtained as a result of the calculations, i.e. the data on the centre of the fixing point, the measuring device directs itself to this centre point or to another, computationally modified directing point. The method of the invention eliminates sources of error caused by a human being, and thus improves the chances of success of the fixing measurement. The reliability of the actual lining measurement is therefore improved, which also results in financial savings, as the service life of container linings can be more efficiently optimized.

BRIEF DESCRIPTION OF THE DRAWINGS

In the following, the invention will be described in greater detail with reference to the accompanying drawings, in which;

FIG. 7 is a schematic top view of the fixing step of FIG. 2, FIG. 8 illustrates the radiation intensity reflected to the receiver detector of the measuring device during the measurement of the fixing points, and FIG. 9 illustrates the retroreflective surface of the wall construction of an annular fixing point.

DETAILED DESCRIPTION OF THE PREFERRED EMBODIMENTS

Figure 1:
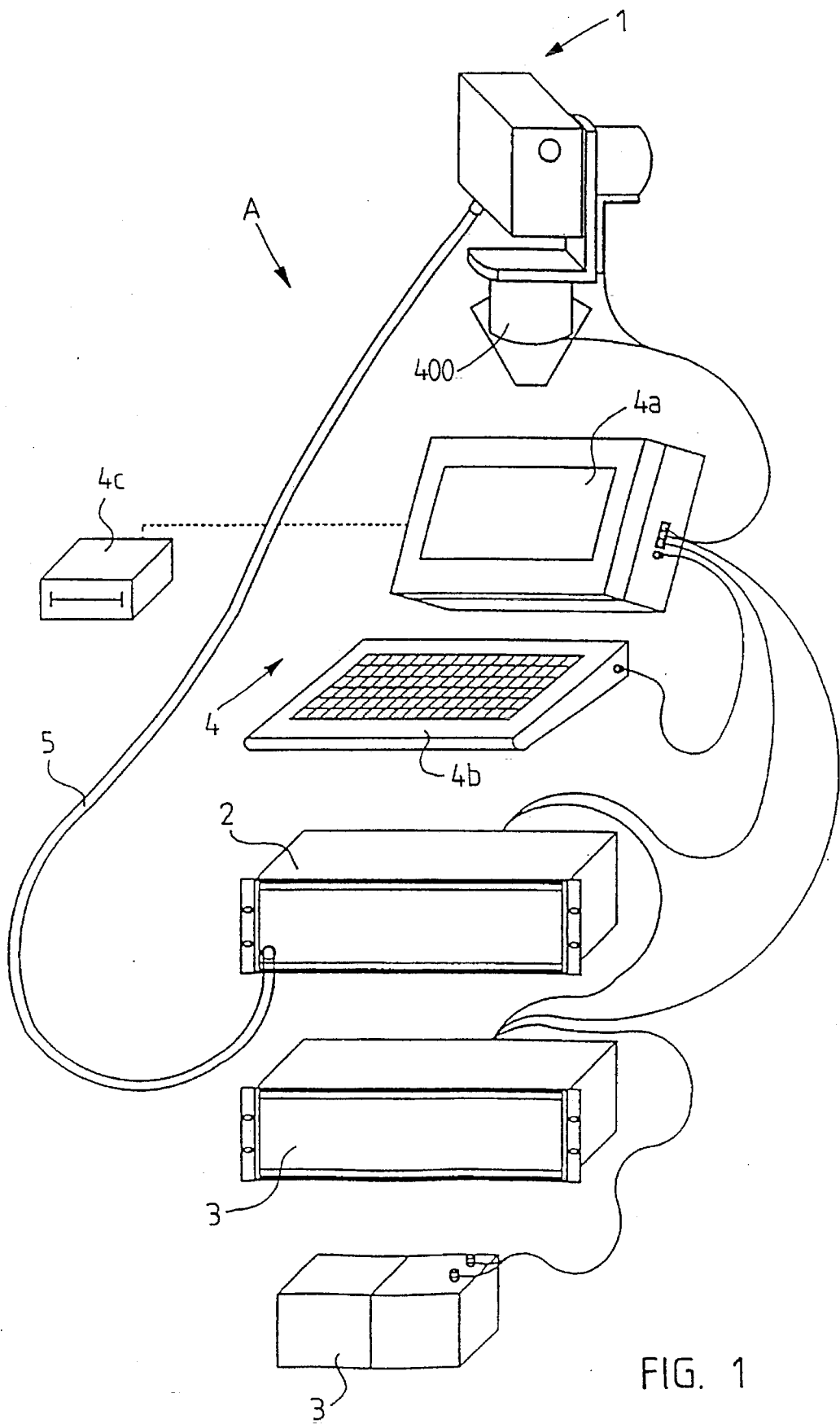
FIG. 1 shows a measuring apparatus.

FIG. 1 shows the configuration of a measuring apparatus A comprising an optical transceiver 1, preferably a laser transceiver, distance measurement electronics 2, a power supply 3, and a control unit 4 comprising a display 4a, a keyboard 4b and a disk drive 4c. The laser transceiver 1 is connected to the distance measurement electronics 2 through a cable 5 comprising three optical fibres, which in conjunction with the distance measurement electronics enable measurement of the propagation time of a laser pulse. The measurement of the propagation time allows the distance between the measuring device and the hitting point of the laser beam emitted by the measuring device to be determined in the actual measurement of the lining and in the measurement of the fixing points. In order for fixing or calibration to be performed, it is necessary to provide at least three fixing points P1, P2, P3 which—as shown in FIGS. 2, 3, 6 and 7—are attached to the actual object, in this case the container 6. FIG. 7 also shows an alternative embodiment, in which the fixing points P11, P12, P13 are positioned outside the object to be measured, for instance on a factory wall 50.

Figure 2:
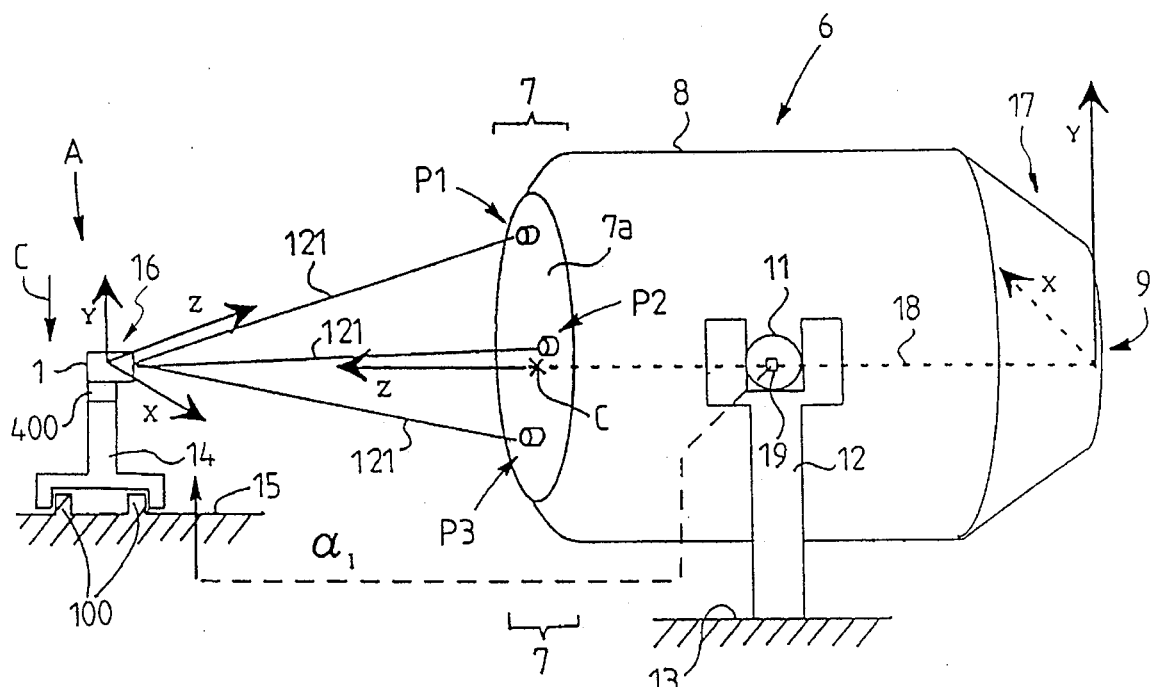
FIG. 2 illustrates the fixing step of lining measurement.
Figure 3:
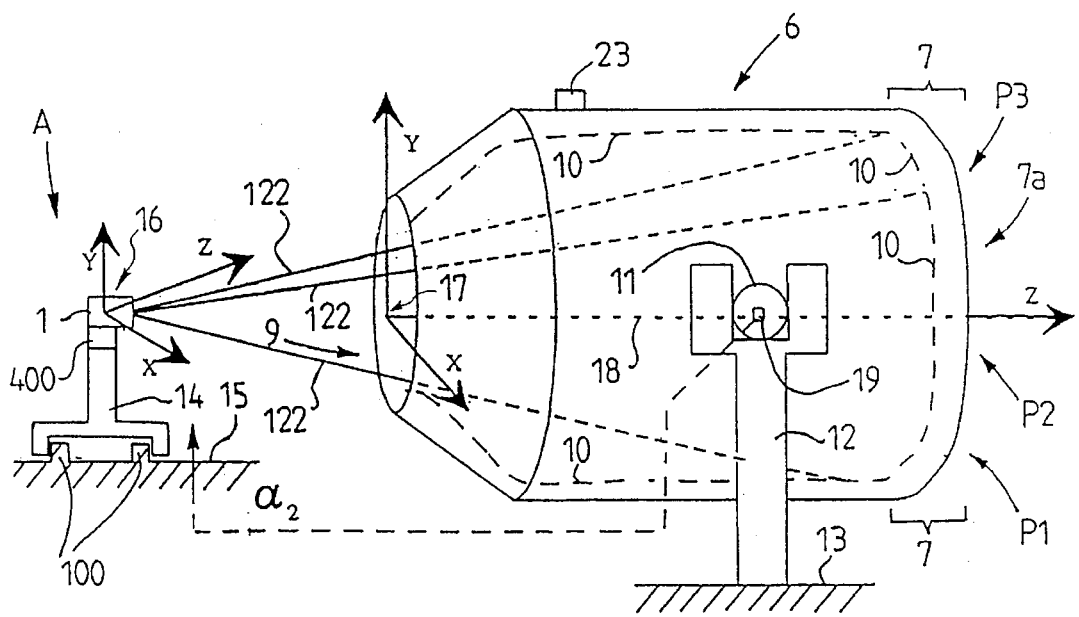
FIG. 3 illustrates the lining measurement step after the fixing.

FIG. 2 illustrates the fixing step of the measuring method, and FIG. 3 illustrates the actual measuring step. FIGS. 2 and 3 show the object to be measured, i.e. a container 6 comprising a bottom 7, a wall 8, an opening 9, and a lining 10, the wear of which is to be measured. The container 6, such as a converter, is hung on its pivoted trunnions or axle 11, which is supported by an axle support 12, which in turn is supported by a lower support surface 13, which in practice is the floor of the lower level of a factory hall. The actual measuring device A—of which FIGS. 2 and 3 show the laser transceiver 1 and its support 14—is disposed on an upper support surface 15, such as a floor, on the upper level of the factory hall, for instance on rails 100 or corresponding structures. The support 14 and thus also the laser transceiver 1 and other components can be transferred on the rails preferably by linear motion with respect to the container 6, as shown in FIG. 7. In FIG. 7, arrow B indicates the horizontal moving direction of the measuring device A and its support 14. Correspondingly in FIG. 2, arrow C indicates the vertical inclination of the laser transceiver in the measuring device; the transceiver may be inclined or tilted in a vertical plane, for instance, by means of an inclination motor 400, by which the transceiver can also be inclined in a horizontal plane.

FIGS. 2 and 3 also show the coordinate system 16 of the measuring device with x-, y- and z-axes. The coordinate system 17 of the object to be measured, i.e. the container 6, correspondingly comprises x-, y- and z-axes. It can be seen from FIGS. 2 and 3 that, mathematically, the coordinate system 17 of the container, or the object to be measured, is set on a plane with the opening 9 of the container. In FIGS. 2 and 3, the centre of the coordinate system 17 is in the middle of the opening 9, and the z-axis of the coordinate system 17 extends along the longitudinal axis 18 of the object, e.g. a container such as a converter. In the coordinate systems 16, 17, the x-axes are horizontal and the y-axes vertical. In addition, FIGS. 2 and 3 show an angle measuring device 19, which measures the inclination of the container and is most preferably disposed on the pivoted axle 11 of the container 6. Angle measurement data can be transmitted to the measuring device via a cable or a radio path, or the angle measurement device 19 may be connected to the display device, from which the operator of the measuring device 1 picks the data and feeds it to the measuring device. The angle measurement device 19 is needed if the container 6 is rotated between the fixing measurement and the measurement of the lining 10; it is also needed when the fixing points (P11, P12, P13, FIG. 7) are positioned outside the container, i.e. in indirect fixing measurement.

With reference to FIGS. 2, 6, 7 and 8 in particular, the coordinate systems 16, 17 of the measuring device and the container are mathematically combined by measuring the positions of specific fixing points P1, P2, P3 in the coordinate system 16 of the measuring device 1. The fixing points P1, P2, P3 that are used in the fixing are of a regular shape, preferably substantially circular, and more preferably annular, which is the best shape in view of measuring accuracy and the calculations. The centres of the fixing points P1, P2, P3 are indicated by p1, p2 and p3, the coordinates of which are in fact the coordinates of the fixing points, which are being measured. In the following, the method will be described mainly with reference to fixing point P1, but the procedure is similar for the other fixing points P2, P3. The position of fixing point P1 in the coordinate system 16 of the measuring device 1 is measured by deflecting optical radiation in two intersecting directions across the annular fixing point P1. In FIG. 6(a), the first deflection is indicated by line 20, formed by the hitting point of the laser beam, and the second deflection is indicated by line 21, also formed by the hitting point of the laser beam. The first deflection, the direction of which is shown by line 20, along which the beam travels (the same direction as that of arrow B), intersects the annular fixing point at intersections 20a and 20b. The intersections 20a and 20b are thus the points where the laser beam 20 hits the fixing point P1. These intersections are detected in the signal received by the receiver detector of the transceiver 1 of the measuring device as intensity peaks 20c and 20d, shown in FIG. 8. Intensity peak 20c is caused by the left edge of the annular fixing point P1, whereas intensity peak 20d is caused by the right edge of the annular fixing point P1, provided that the laser beam is deflected from left to right. Correspondingly, the second deflection, in the direction of beam 21 (the same direction as that of arrow C), intersects the annular fixing point at intersections 21a and 21b, which can be observed in the signal received by the receiver detector of the transceiver 1 of the measuring device as intensity peaks 21c and 21d, shown in FIG. 8. Intensity peak 21c is caused by the upper edge of the annular fixing point P1, and intensity peak 21d is caused by the lower edge of the fixing point P1, provided that, during the second deflection, the laser beam is deflected from the top downwards. The optical radiation reflected from the annular fixing point P1 is thus measured to determine, in both deflection directions, at least two points where each optical radiation line 20, 21 intersects the annular fixing point P1; in other words, the intersections 20a, 20b, 21a and 21b are determined. The directing point, preferably the centre p1 of the fixing point P1, is determined on the basis of these at least four intersections. After the deflections and calculations, the optical radiation emitted by the measuring device 1 is directed to this directing point in order for the coordinates of the fixing point to be determined in the coordinate system of the measuring device. In a preferred embodiment, the directing point, i.e. the centre p1 of the fixing point P1, is thus calculated by means of the intersections 20a, 20b, 21a and 21b. The optical radiation emitted by the measuring device is directed to this centre p1 in order for the coordinates of the fixing point to be determined in the coordinate system of the measuring device. The measuring device A thus measures the coordinates of the hitting point p1 of its laser beam, directed to the centre p1, in its coordinate system 16. Calculation means included in the measuring device A and connected to the distance measuring electronics are employed in the calculations required for determining the directing point, i.e. the centre p1. The calculation means may consist e.g. of a calculation program included in the control unit 4. It is easy to determine the centre p1 of the annular fixing point P1, as the centre line 20e midway between the intersections 20a, 20b of the first deflection, which is also the centre line of the fixing point P1, and the centre line 21e midway between the intersections 21a, 21b of the second deflection, which is also the centre line of the fixing point P1, intersect substantially at the centre p1 of the annular fixing point P1. This geometric dependency calculation can easily be performed by means of a program in the control unit 4, as stated above. The outside diameter of the annular fixing points P1, P2 and P3 is a few dozen centimetres when the thickness of the wall is a few centimetres, e.g. three centimetres in the case illustrated in FIG. 9.

As shown in the figures, the directions in which optical radiation is deflected across the fixing point, i.e. lines 20 and 21, are substantially perpendicular to each other. In addition, the deflections of optical radiation are preferably parallel to two axes of the coordinate system 16 of the measuring device. The first deflection, or the line along which the beam travels, for example, is horizontal, i.e. parallel to plane 15 and arrow B in FIGS. 7 and 9. The second deflection, i.e. beam 21, is vertical, i.e. parallel to arrow C in FIGS. 2 and 6. The first deflected beam 20, which crosses the fixing point P1, is parallel to the x-axis, whereas the second deflected beam 21, which crosses the fixing point P1, is parallel to the y-axis. This embodiment is the easiest one to realize, and it also facilitates the calculation of the directing point, or in practice the centre. Horizontal deflection and vertical deflection, i.e. the first and the second deflection, can be carried out, for example, by an inclination motor, a lifting motor or a corresponding device 400 which inclines the transceiver 1 in the lateral direction or lifts/lowers it.

The movement of the support 14 of the measuring device A, 1 on the rails 100, for example, can be utilized for rough location of the fixing points before the first deflection. By moving the carriage construction in the direction of the rails 100 provided under the carriage-like support 14 of the measuring device A, 1, the measuring device can be placed within the correct area, from which the first deflection can be started.

It is not necessary to use a carriage-like support 14 and rails 100; the measuring device A can also be mounted on a conventional support, such as a three-legged support.

In FIG. 2, the beams 121 can be considered to represent beams to be deflected across the fixing points P1, P2, P3 and back to the receiver detector, or they can be considered to represent beams emitted, after the deflections and calculation of the centre, to the centres p1, p2, p3 and back to the receiver detector. It will be obvious that only one of the beams 121 is emitted at a time. In FIG. 3, the beams 122 represent the actual measurement of the lining, performed after the fixing measurement.

In a preferred embodiment—before the second deflection (beam 21), the direction of which intersects that of the first deflection (beam 20)—the actual or imaginary hitting point of radiation is returned, with a motion in the reverse direction in relation to the first deflection, to the inner area of the annular fixing point P1, or to the area of the projection of the inner area, said projection being parallel to the second deflection. For the second deflection (line 21), the beam is thus already positioned in an area from which it is possible to provide such a deflection that the second deflection beam 21 and the fixing point P1 intersect at two points 21a, 21b. A return motion, the direction of which is reverse to that of the first deflection but parallel to it, can easily be effected by means of the return motion of the inclination motor or the like 400. To further elaborate the solution described above, it is also possible that in a preferred embodiment—before the second deflection (line 21), the direction of which intersects that of the first deflection (line 20)—the actual or imaginary hitting point of radiation is returned to a point which at least approximately corresponds to the middle 300 of the distance between the intersections 20a, 20b measured during the first deflection; this renders the method mathematically easiest to perform, as the second deflection forms the centre line 20e between the intersections 20a, 20b of the first beam, said centre line being directed to the centre p1 which is to be calculated. By the above-mentioned term 'imaginary hitting point', it is meant that the measuring device can also be moved or inclined while the beam is turned off, which is, however, not necessary.

In the method of the invention, the detection of the intersections and the reflection measurement even in other respects can be performed as distance measuring or reflection intensity measuring. In the case of distance measuring, the annular fixing points P1, P2, P3 are so formed that the distance between them and the measuring device 1 is clearly different from the distance between the area surrounding them, e.g. the bottom 7 of the container 6, and the measuring device. In this case, the intensity peaks 20c, 20d in FIG. 8 denote that at those points, i.e. at the intersections 20a, 20b, the receiver detector of the measuring device 1 detected the edges, or wall 150, of the fixing point P1, said wall being closer to the receiver detector than the rest of the bottom 7 of the container 6.

In the case of measuring based on reflection intensity, the annular fixing points P1, P2, P3 are so formed that their reflectivity is clearly different from that of the surrounding area of the fixing points P1, P2, P3, e.g. the container bottom 7. In this case, the intensity peaks 20c, 20d in FIG. 8 denote that at those points the receiver detector of the measuring device 1 detected the edges of the fixing point 1, which are more reflective than the rest of the container bottom. Particularly in the case of reflection intensity measuring, the fixing point—in practice the wall 150 of the fixing point, which is, for example, three centimetres wide—comprises a retroreflective surface 200, shown in FIG. 9. The retroreflective surface 200 reflects the radiation from the fixing point to a direction which is reverse to that of the emitted beam but parallel to it, i.e. directly back to the measuring device 1. This embodiment improves the measuring accuracy and the intensity levels. Instead of a retroreflective surface, it is possible to use fixing points P1, P2, P3 whose reflection intensity differs clearly from that of the area surrounding them.

Figure 6A:
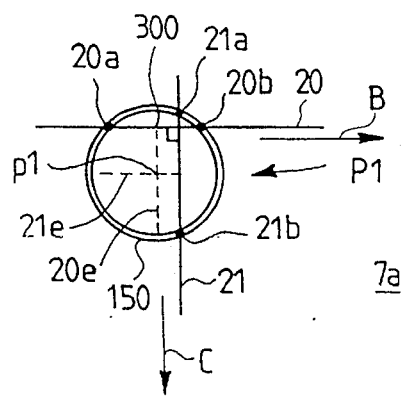
FIGS. 6(a), 6(b) and 6(c) illustrate fixing points on the bottom of the container.
Figure 6B:
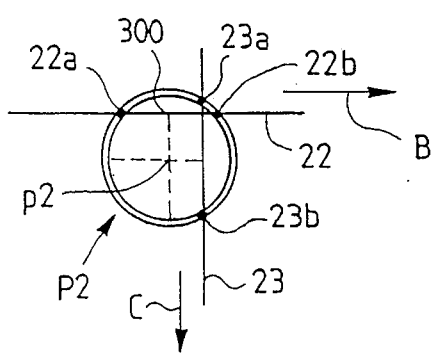
Figure 6C:
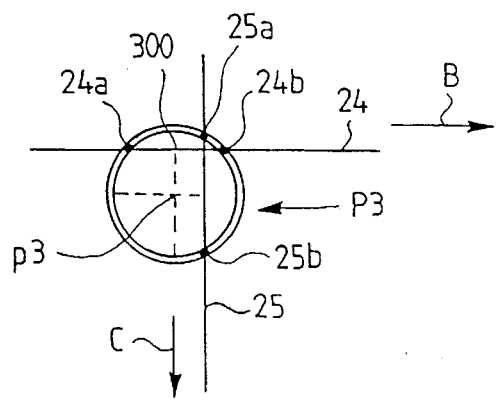

In the above, the fixing procedure according to the invention has been described mainly with reference to the first fixing point P1. It will be obvious that the procedure is similar even with the other fixing points P2, P3 as shown in FIGS. 6(b) and 6(c). In the case of the second fixing point P2, and correspondingly in the case of the third fixing point P3, there is a laser beam line 22 drawn by the hitting point of the first deflection, and a laser beam line 23 drawn by the hitting point of the second deflection, correspondingly lines 24, 25; in addition, there are intersections 22a, 22b, 23a, 23b, correspondingly 24a, 24b, 25a, 25b, between the deflected beam and the annular fixing point P2, correspondingly P3. The intersections cause the intensity peaks detected by the receiver detector of the measuring device 1, as shown in FIG. 8. The centres p2, p3 of the fixing points P2, P3 can easily be calculated on the basis of these peaks. The laser beam is directed to both of these centres in turn, and the coordinates of the hitting point of the beam are measured there.

In a preferred embodiment, it is estimated on the basis of the distance between the coordinates measured from the directing points p1, p2, p3 whether the fixing succeeded sufficiently well. It is possible to make such a comparison, since the actual distance between the fixing points was measured when the fixing points were originally mounted on the container. If the difference between the coordinates of the fixing points obtained by the fixing measurement differs too much from the actual distance stored in the memory of the measuring device, the device gives an error message to indicate that the fixing should be performed all over again.

In a preferred embodiment, the coordinates of the fixing points P1, P2, P3 (centres p1, p2, p3) mounted on the object, i.e. the container 6, as shown e.g. in FIGS. 2, 6 and 7, are measured in the coordinate system 16 of the measuring device as illustrated in FIGS. 2 and 3, from a direction which is substantially opposite to the direction from which the measuring of lining 10 on the inner surface of the container 6 is performed after the fixing. In this preferred embodiment, the fixing is performed so that the position of the fixing points P1, P2, P3 (centres p1, p2, p3) in the coordinate system 16 of the measuring device is measured in the bottom 7 area of the container 6 by the use of fixing points P1, P2, P3 positioned therein. Thereafter the container 6 is rotated around its pivoted axle 11 to a position where the opening 9 of the container 6 faces the measuring device 1, as shown in FIG. 3. For the fixing, the present method also utilizes the difference between angle data $\alpha_1$ obtained during the measurement of the fixing points P1, P2, P3 and angle data $\alpha_2$ obtained after the rotation of the container. The angle difference is obtained by an angle measuring device which is known per se and which measures the inclination of the container 6. In the fixing step, in addition to the calculated coordinates of the centres p1, p2, p3 of the fixing points P1, P2, P3, said centres being measured according to the invention, it is thus necessary to have angle values, and also data on the distance between the pivoted axle 11 and the opening 9 (when the x-y plane is set on a plane with the opening). In accordance with FIGS. 2 and 3, the bottom 7 of the container 6 refers to the circular bottom portion 7a of the container, the wall 8 of the container refers to the rear-most areas or to the (e.g. slanting) area between the rear-most areas of the container walls and the circular bottom portion. The fixing points P1, P2, P3 within the area of the container bottom 7 are sheltered in the best possible manner, the visibility to the measuring device 1 is good, and they have the most advantageous position in view of the calculations.

With reference to FIG. 7, in a preferred embodiment, the position of the fixing points in the coordinate system 16 of the measuring device 1 is measured by the use of annular fixing points P11, P12, P13 positioned outside the container. The fixing points P11, P12, P13 are attached, for example, to the factory wall 50 or elsewhere in the vicinity of the container. Fixing to the annular fixing points P11, P12, P13 (centres) is performed as described above, but in addition to the coordinates of the centres measured in accordance with the invention, the calculation is based on the angle value obtained from the angle measuring device 19, and data on the location of the fixing points P11, P12, P13 with respect to the container. These data allow the coordinate systems to be mathematically combined.

Figure 4:
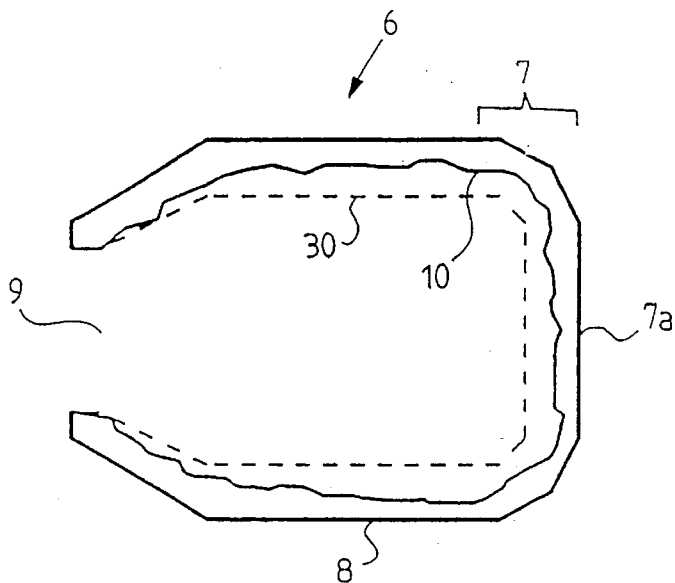
FIG. 4 is a reference diagram of a worn container as compared with an unworn one.
Figure 5:
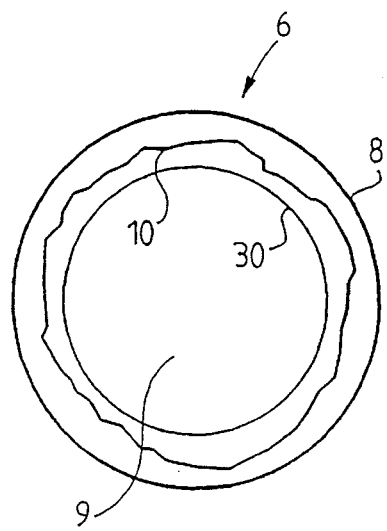
FIG. 5 is a reference diagram in accordance with FIG. 4, seen in the longitudinal direction of the container.

In FIGS. 4 and 5, line 30 represents the surface of the lining on the inner surface of the container 6, measured in the modelling step. Curve 10 represents the surface of a worn lining; the curve has been obtained by directing a laser beam with the measuring device 1 through the container opening to the lining on the inner surface of the container, as shown in FIG. 3. In the actual measurement of the lining, the points to be measured from the lining 10 on the inner surface of the container are measured in the coordinate system 16 of the measuring device. The measured worn lining is compared with the lining measured in the modelling step as shown in FIGS. 4 and 5, for instance on the screen 4a of the display terminal shown in FIG. 1.

Generally speaking, the method can be used for combining the coordinate systems of an object to be measured and a measuring device. The object to be measured can thus be other than a container. The method does not have to be applied to measuring wear in a lining or another coating; it may also be employed for some other measurement in which it is necessary to combine the coordinate systems of the object to be measured and the measuring device.

Although the invention has been described above with reference to the examples according to the accompanying drawings, it will be obvious that the invention is not restricted thereto but can be modified in many ways within the scope of the inventive concept disclosed in the appended claims.

We claim:

1. In a method for positioning a measuring device which emits and receives optical radiation to measure wear in the lining of a container, said method involving fixing coordinate systems for the measuring device and the container by combining said coordinate systems, and individually determining the positions of a plurality of specific fixing points in the coordinate system of the measuring device, wherein each of said fixing points has a substantially regular geometric shape, a method for determining the position of each fixing point comprising the steps of:

a) deflecting an optical radiation beam across the fixing point in first and second intersecting directions, b) measuring optical radiation reflected back from the fixing point, c) determining at least four intersections, two in each deflection direction, between the fixing point and the optical radiation beam from the optical radiation reflected back to the measuring device, and d) calculating a target point from said at least four intersections to which the optical radiation beam can be directed to determine the coordinates of the fixing point in the coordinate system of the measuring device.

2. A method according to claim 1, wherein the fixing points are substantially circular in shape.

3. A method according to claim 1, wherein the fixing points are substantially annular.

4. A method according to claim 1, wherein a centre of the fixing point is calculated from the intersections to define the target point.

5. A method according to claim 1, wherein the intersections are detected by one of distance measuring and reflection intensity measuring.

6. A method according to claim 5, wherein the fixing points comprise a retroreflective surface.

7. A method according to claim 5, wherein an optical reflectivity of the fixing points is significantly different from that of an area of the container surrounding the fixing points.

8. A method according to claim 5, wherein a distance between the measuring device and the fixing points is different from a distance between the measuring device and an area of the container surrounding the fixing points.

9. A method according to claim 1, wherein the directions in which optical radiation beam is deflected across the fixing point are substantially perpendicular to each other.

10. A method according to claim 1, wherein the directions in which optical radiation beam is deflected are parallel to two axes of the coordinate system of the measuring device.

11. A method according to claim 1, wherein, before the deflection in the second direction, the beam is returned to an actual or imaginary target point in an inner area of the fixing point, or in an area of a projection of the inner area parallel to the second deflection direction by moving the beam in a reverse direction.

12. A method according to claim 11, wherein said actual or imaginary target point approximately corresponds to a mid-point between the intersections measured during the first deflection.

13. A method according to claim 1, wherein the container has a pivoted axle and an end opening, and angle data on an inclination of the container is measured, whereby the fixing is performed by measuring, in an area of the bottom of the container, the positions of the fixing points in the coordinate system of the measuring device by using fixing points mounted on the container bottom, whereafter the container is rotated around its pivoted axle to a position at which the end opening of the container faces the measuring device, the fixing being performed utilizing an angle difference between angle data obtained during the measurement of the fixing points and angle data obtained after the rotation of the container.

14. A method according to claim 13, wherein the locus of the fixing points is centered with respect to a longitudinal axis of the container.

15. A method according to claim 1, wherein the positions of the fixing points in the coordinate system of the measuring device are measured by using fixing points which have a substantially regular geometric shape and which are positioned outside the container.

* * * * *